United States Patent
Beckwith et al.

(10) Patent No.: US 7,474,618 B2
(45) Date of Patent: Jan. 6, 2009

(54) PARTITIONING COMMUNICATION SYSTEM

(75) Inventors: Reynolds William Beckwith, Great Falls, VA (US); Jeffrey William Chilton, Reston, VA (US); Jeffrey Grant Marshall, Leesburg, VA (US)

(73) Assignee: Objective Interface Systems, Inc., Herndon, VA (US)

( * ) Notice: Subject to any disclaimer, the term of this patent is extended or adjusted under 35 U.S.C. 154(b) by 562 days.

(21) Appl. No.: 11/125,099

(22) Filed: May 10, 2005

(65) Prior Publication Data

US 2006/0198358 A1    Sep. 7, 2006

Related U.S. Application Data

(60) Provisional application No. 60/657,419, filed on Mar. 2, 2005.

(51) Int. Cl.
*H04J 1/16* (2006.01)
*H04L 1/00* (2006.01)

(52) U.S. Cl. .................. 370/232; 370/229; 370/230; 370/231; 370/235; 370/237; 370/465; 370/466; 370/468; 710/30; 713/164

(58) Field of Classification Search ........... None
See application file for complete search history.

(56) References Cited

U.S. PATENT DOCUMENTS

| 5,923,849 | A | 7/1999 | Venkatraman |
| 6,772,416 | B1 * | 8/2004 | White et al. ............ 718/102 |
| 2004/0025016 | A1 * | 2/2004 | Focke et al. ............ 713/164 |
| 2005/0198412 | A1 * | 9/2005 | Pedersen et al. ......... 710/30 |

OTHER PUBLICATIONS

U.S. Government Protection Profile for Separation Kernels in Environment Requiring High Robustness (SKPP), Version 0.621, Jul. 1, 2004.
Common Criteria brochure.

* cited by examiner

*Primary Examiner*—Chi H Pham
*Assistant Examiner*—Raj Jain
(74) *Attorney, Agent, or Firm*—Venable LLP; Robert S. Babayi (57) ABSTRACT

A system and method for communicating data between two nodes defines a plurality of separate partitions on each node and assigns one or more subjects to at least one of the plurality of the separate partitions. The subjects in each node communicate data with each other over one or more channels. For communicating the data, the present invention separates data communications on a channel from that of other channels. More specifically, each node runs under the control of a separation kernel (SK) that partitions the nodes to define the subjects according to an SK configuration data. A partitioning communication system (PCS) separates the communications channels according to a PCS configuration data.

12 Claims, 5 Drawing Sheets

PARTITIONING COMMUNICATION SYSTEM

FIELD OF THE INVENTION

The present invention generally relates to the field of communications and more particularly to communicating information in secure environments.

BACKGROUND

Secrecy classifications and access policies have been used to promote security in information systems. Secrecy is usually defined as the prevention of unauthorized access to information. Generally, a system designed for security follows a set of access rules that prevent unauthorized access to and tampering with sensitive information.

The National Computer Security Center (NCSC) was a U.S. government organization within the National Security Agency (NSA) that evaluates information systems for high security applications to ensure that facilities processing classified or other sensitive material use trusted computer systems and components. The NCSC's evaluation program was carried out by another NSA organization called the Trusted Product Evaluation Program (TPEP), which tests commercial products against a comprehensive set of security-related criteria.

The NCSC issued the first Department of Defense (DoD) Trusted Computer System Evaluation Criteria (TCSEC) in August of 1983. The document, more commonly referred to as the "orange book," was reissued in 1985 as a DoD standard that included the stated goals of providing security-related standards for processing sensitive material.

However, information security development processes in various countries (e.g., in the US, Canada and Europe) has led to the pooling of resources, experiences and wisdom for creating a Common Criteria (CC) for a flexible approach to the standardization of security functionality and evaluation assurance. Generally, the CC defines a set of requirements of known validity, which can be used in establishing security requirements for prospective products and systems. Using the CC, consumers and other parties can specify the security functionality of a product in terms of standard Protection Profiles (PP) and independently select an Evaluation Assurance Level (EAL). More specifically, a PP defines an "implementation independent" set of security requirements and objectives for a category of products or systems which meet similar needs for security. Currently, PPs have been developed for firewalls, relational databases and other system components to enable compatibility with various ratings from a defined set of seven increasing EALs, i.e., EAL1-EAL7.

Usually, the PP contains the rules that govern interactions between processes that attempt to access information (also known as subjects) and processes that are the objects of attempted accesses (known as objects). The exchange between these processes is usually classified by security identifiers that reflect the sensitivity of the data. Such identifiers are referred to as "secrecy levels." For example, "top secret" information may have the highest secrecy level where only those with highest level of secrecy would have access permission. Information within a given secrecy level may also be "categorized" for further restriction in terms of access. Access to each secrecy category may be restricted to those having not only the requisite clearance for the secrecy level, e.g., "top secret," but also clearance for the particular secrecy category, e.g., "need-to-know." The combinations of the secrecy levels and secrecy categories are known as "secrecy classes." In mediating access to information, a secure system compares the secrecy class of the subject to the secrecy class of the object and determines if the subject is allowed to access the object.

Security in a system can also be characterized by the existence of "overt" or "covert" channels. An overt channel is a communication path that is intended to be part of the system in compliance with the security policy. A covert channel on the other hand is an illicit path that uses shared system resources in violation of the system's security policy. For example, a corrupt process designed to operate illicitly within the system, such as a "Trojan Horse", may gain access to high-value data and use the shared resources as a covert channel to facilitate illicit transmission of information to a "spy agent," which would otherwise not have access to it. Some examples of covert channels can be found in "Transmission Schedules To Prevent Traffic Analysis," 9th Annual Computer Security and Applications Conference, 1993, Orlando, Fla., B. R. Venkatraman and R. E. Newman-Wolfe.

There are two types of convert channels: covert timing channels and covert storage channels. Covert timing channels arise as a result of the availability or unavailability of particular system resources during particular time intervals. "Cache-type" and "scheduler-type" covert channels are two examples of covert timing channels. A "scheduler-type" covert channel illicitly exploits the timing of scheduler functions, which serve to allocate CPU time as a resource among various processes. A "cache-type" covert channel uses high-speed cache storage to illicitly transmit information by modulating the time required to complete a cache operation. Covert storage channels usually involve direct or indirect modification of storage memory by one process (the sender of a covert message) and the direct and indirect reading of the memory location by another process (the receiver of the covert message).

One requirement for higher EAL ratings is the closure of most if not all of the covert channels. Lower EAL ratings require reducing the rate at which information can be transferred, i.e., the bandwidth of the covert channels. One means for closing a cache-type covert channel is to clear the cache storage when control of the CPU is transferred from one process to another. A scheduler-type covert channel can be closed by assigning each running process a fixed quantum of CPU time and to idle away any remainder of the assigned time if the running process does not use it. However, it is known that these methods for closing the covert channels could exact a high performance penalty that degrades system performance. It has also been recognized that avoiding resource sharing can eliminate covert channels, the implementation of which is often impractical.

U.S. Pat. No. 5,923,849 discloses a method for auditing and controlling overt and covert communication traffic in a communication system. The method identifies and uses certain parameters to characterize system communication traffic, including the volume of communication between a given pair of nodes, the frequency of communication between a given pair of nodes, the order of communication between a set of nodes, the (extrinsic) nature of communication between a given pair of nodes, and the length (or duration) of transmission. Using one or a combination of these parameters, the method determines "baseline" system conditions and audits the behavior and operations of overt and covert communication activity to detect "out-of-baseline" traffic patterns.

The concept of separation has also been used for construction, analysis and evaluation of secure systems. Separation can be physical or logical. Logical separation usually involves logical entities, such as software programs or processes. If two logical entities are truly separate, then one can not influence the operation of the other, and vice versa. If the operation of one entity is important to the security of the system, the separation of the two from each other allows the operation of one to be ignored when evaluating how the other supports the security of the system. However, if the two logical entities are not separate, then both must be considered in evaluating how each supports the security of the system. The necessity of evaluating both entities increases the difficulty and cost of the security evaluation, and usually yields a lower assurance of security.

U.S. Pat. No. 6,772,416 discloses a computer system that supports a high degree of separation between processing elements. The computer-implemented system executes an operating system having a kernel and includes a plurality of cells. Each cell has one or more processing elements, a domain of execution and a collection of "strands" or tasks, where each strand or task is a stream of programmable machine instructions executable by the kernel of the operating system. A separation specification governs communication between the processing elements and administers the communication between the processing elements in accordance with the separation specification such that one processing element can influence the operation of another processing element only as set forth by the separation specification.

The NSA has also published a PP entitled "U.S. Government Protection Profile for Separation Kernels in Environment Requiring High Robustness" (SKPP), which is hereby incorporated by reference. The SKPP specifies the security functional and assurance requirements for a class of Separation Kernels (SKs). Unlike the traditional security kernels that perform all trusted functions for a secure operating system, a SK's primary function is to partition or otherwise separate resources into policy-based equivalence classes and to control information flows between subjects and resources assigned to the partitions according to the SK's configuration data.

Physical separation in a system is implemented by a set of physically separate devices, nodes, or network components interconnected by separate wires. For example, it is known to have physically separate networks that are assigned to correspondingly separate security classifications. For example, one network can be assigned to support "top secret" classification, while a separate network is assigned to support "unclassified" classification. This arrangement, however, leads to expensive redundancy and could be cumbersome to procure, operate, and maintain.

Therefore, there exists a need for communication system that is simple and effective in conforming to high security assurance levels.

SUMMARY OF THE INVENTION

Briefly, according to one aspect of the present invention, a system and method for communicating data between any two nodes defines a plurality of separate partitions on each node and assigns one or more subjects to at least one of the plurality of the separate partitions. The subjects in each node communicate data with each other over one or more channels. For communicating the data, the present invention separates data communications over a channel from that of the other channels. More specifically, each node runs under the control of a separation kernel (SK) that partitions the nodes according to an SK configuration data. A partitioning communication system (PCS) separates the channel from the other channels for communicating the data according to a PCS configuration data.

According to some of the more detailed features of this aspect of the present invention, the PCS configuration data defines per channel allocated communication throughput, allocated bandwidth; allocated data rate, or a proportional share of available bandwidth. The PCS modifies one or more of the quantity of the data, timing of the data, duration of the data, communication frequency of the data; size of the data, destination of the data and content of the data in accordance with the PCS configuration data to eliminate illicit information flows.

According to another aspect of the invention, a node communicates data with another node over one or more channels. The node comprises a separation kernel that creates a configurable plurality of partitions and a communication controller that controls configurable inter-node communication of data to or from at least one of the plurality of partitions over the one or more channels. In one embodiment the communication controller comprises a partitioning communication system (PCS) that provides separation between the plurality of channels.

According to some of the more detailed features of this aspect of the invention, the PCS controls the inter-node communications according to an information flow policy that obscures an exhibited communication characteristic over at least one of the one or more channels to prevent violations of the information flow policy. In one exemplary embodiment, the information flow control policy requires confidentiality of the inter-node communication by cryptography or encryption. Additionally, the PCS implements an access control policy that defines the limits of the subject's communication over the one or more channels.

Preferably, one or more resources used by the channels to communicate data are assigned to the partitions. According to this embodiment, the PCS implements a resource management policy for sharing the one or more resources, where the resource management policy also defines how the one or more channels influence each other. In another exemplary embodiment, the resource management policy defines quotas for sharing the one or more resources.

According to still other detailed features of the invention, the PCS clears residual information from the one ore more resources after each resource is used and prevents delivery or use of illicit replayed data.

DETAILED DESCRIPTION OF THE INVENTION

The present invention relates to a communication controller that meets information security requirements in a distributed computing environment where a high degree of robustness is required. The communication controller of the present invention is hereinafter referred to as the Partitioning Communication System (PCS). In one exemplary embodiment, the PCS is used to provide highly secure communication between at least two separate nodes over shared communication resources. The exemplary PCS is designed to be conformant to the security requirements equivalent to the Evaluated Assurance Level 7 (EAL 7), as defined in the Common Criteria (CC) V 2.2 [ccv22], which is hereby incorporated by reference.

In general, the PCS comprises a communication controller within a node that communicates data with another node over one or more channels. The communication controller deploys a combination of hardware and/or software, which provides inter-node communications amongst nodes that are run under the control of a Separation Kernel (SK). One exemplary class of SK that may be used with the PCS is described in the SKPP, referenced above. The SK provides to its hosted software programs high-assurance partitioning and information flow control properties that are both tamperproof and non-bypassable. These capabilities provide a trusted foundation upon which the enforcement of specific application-level (vs. kernel-level) security policies can be achieved. Examples of these software programs include multilevel secure reference monitors, guards, device drivers, file managers, and message-passing services, as well as those for implementing operating system, middleware and virtual machine monitor abstractions.

As described further in detail, the SK partitions each node to define subjects and resources according to an SK configuration data. Once the nodes are properly partitioned, the PCS enforces configurable security policies on inter-node communications amongst the nodes using shared communication resources, as further described below. In this way, the PCS configurably controls inter-node communication of data to or from at least one of the plurality of partitions over the one or more channels. Consequently, the PCS enables policy-constrained inter-node communications in a distributed system. In one exemplary embodiment, the PCS supports Multi Level Secure (MLS) systems that enables secure, distributed communications upon which many higher-level technologies may be layered. As such, the PCS can be used as a building block for implementing trustworthy distributed systems.

System Overview

Figure 1:
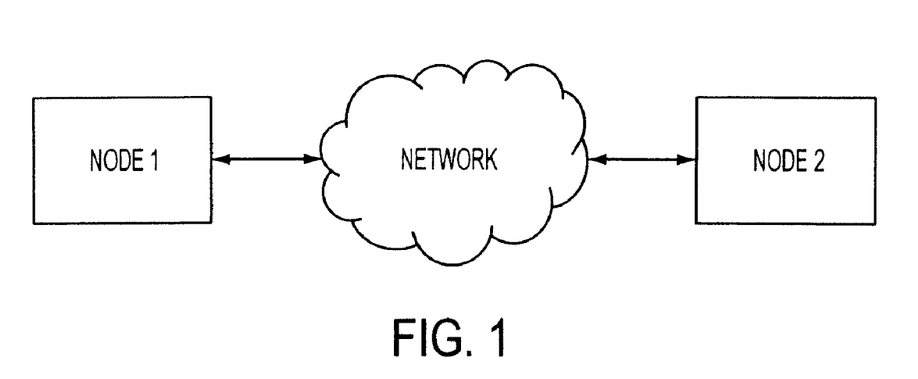
FIG. 1 is a simple block diagram of a system that uses the PCS according to the present invention.

FIG. 1 shows a block diagram of an exemplary system that advantageously uses the PCS. The system comprises a node 1, which communicates with node 2 across a network. Communication over the network may use any suitable combination of layers (such as physical, link, network, or transport) that support any standard or proprietary communication protocols. Examples of transport protocols that are suitable for transporting data across the system of the invention comprise any real time or non-real time protocols. The transport layer may also support transport technologies with or without Quality of Service (QoS), such as ATM or TCP/IP. The link connecting the nodes 1 and 2 across the network can be a wired link, such as one defined by IEEE 802.3, or a wireless link, such as one defined by IEEE 802.11x. Example of physical layer used the in the system of the present invention include twisted pair, coaxial cable, optical cable, or any known suitable wiring or wireless technologies.

Although FIG. 1 represents a "loosely coupled" network implementation of the present invention, it should be noted that the distributed system in which the PCS is used may also comprise any type of embedded system where the nodes communicate with each other in a tightly integrated manner, for example across a VME back plane. In one embodiment, each node runs under the control of an operating system that supports predictable worst-case bounds (real-time) processor scheduling.

Each node 1 or 2 in FIG. 1 includes a processor hardware base (not shown), such as one or more CPUs, microprocessors, embedded controllers, digital signal processors, etc, for executing codes, programs, and/or applications. Each one of the node 1 or 2 can be any one or combination of a computing node, a wired or wireless node, a client station, a server station, a router, a hub, an access point, or any other known device which communicates with other devices using shared communication resources. In addition to the nodes 1 and 2, the network may include other nodes, such as server stations, client stations, a host or central station, which are linked together via any collection of interconnected (public and/or private) networks, such as the Internet.

Each node uses a load procedure to convert the software implementation and/or configuration data of a node into a useable form. The initial load function can take different forms, including: placement of the implementation or configuration information onto suitable media (e.g., CD, ROM or flash memory); or compilation of configuration data as part of the implementation. Preferably, a trusted individual or IT mechanism initiates the functions for starting and initializing the node, e.g. via a power-on switch or other mechanism accessible to the IT environment. Initialization includes the boot function that brings each node's implementation code and data into its execution domain, for example, by reading it from disk, from ROM, or from flash memory into a memory space allocated for node functions and data. The initialization function also includes verification of the integrity of the code and configuration data in the node. In a non-embedded environment, the trusted individual may need to employ further evaluated procedures, after or during which the initialization functions complete the transformation of the node into a secure initial state, when the node has consistent security related data and can correctly enforce a promulgated security policy (SP).

Separation Kernel

The SK comprises hardware and/or software mechanism whose primary function is to create multiple partitions for the node. A partition is an abstraction implemented by the SK from resources under its control according to a configuration data that implements all or portions of the SP. Each SK partition comprises at least one subject and/or resource. A subject is any active entity within the scope of control of the node that performs a function, for example, an inter-node communication function. A resource comprises any hardware, firmware, data, and/or software that is executed, utilized, created, protected, or exported in each node. Resources may be used by subjects individually or simultaneously to allows the subjects to access information within the resources. Resources may also comprise transport, network, link, communication bus, I/O bus, memory bus, hardware or software encryption unit, socket library, protocol stack, device driver, etc. resources.

The resources are classified as exported or internal, depending on whether they are available externally via a SK interface. The SK interface refers to the programming or configuration interface that allows the SK to access a resource or subject. If a resource is used to implement security functions, then it is an internal resource since it is not accessible via the SK interface. However, if a resource is not implementing any security functions, it may be accessed by the SK interface, which make it an exported resource. Resources that are by default accessible by all partitions are virtualized and exported. It should be noted that partitions are not active entities by themselves. Rather, each partition comprises a set of subjects and a set of resources that are within the same policy-based equivalence class as defined by the SK configuration data. Each node uses the SK configuration data to partition or otherwise separate and isolate the subjects and resources, including a CPU, memory, etc.

The SK achieves isolation of subjects in different partitions such that each partition encompasses a resource set that appears to be entirely its own. This is known as virtualization. For example, in order to achieve virtualization for resources that can only be accessed by one subject at a time, such as the CPU, the SK ensures that the temporal usage patterns from different partitions are not apparent to each other. Other resources, such as memory, may be accessed by different partitions simultaneously, while preserving idealized isolation, if the SK ensures, for example, that partitions are allocated different and non-interacting portions of the resource. Furthermore, SK utilization of its own internal resources must also preserve the desired isolation properties. The SK can also provides audit services for detecting failure, such as, for example, a security failure, a system failure, or an attempted security breach.

SK Configuration

The SK uses a set of configuration data to establish partition definitions and allocation of resources to partitions. The SK configuration data provides the control information used by the node during initialization to define the secure initial state and its behavior during runtime. The SK configuration data assigns (binds) each exported resource to a single partition for the purposes of defining such partitions. Every subject is also assigned to a single partition by the SK configuration data for the purposes of defining partitions. The SK configuration data consists of SK flow policy configuration data and supporting policy configuration data, which define the information flow control and partition flow control policies for communication between and within partitions. SK non-flow policy configuration data defines all other configurable SK critical data, such as audit configuration parameters, cryptographic configuration parameters, clock settings and execution period for self-test. The content and format of the SK configuration data may take different forms, depending on the scope and granularity of the information flow control and partition flow control policies that are enforced as well as on other factors of system design.

Node Partitioning

Figure 2:
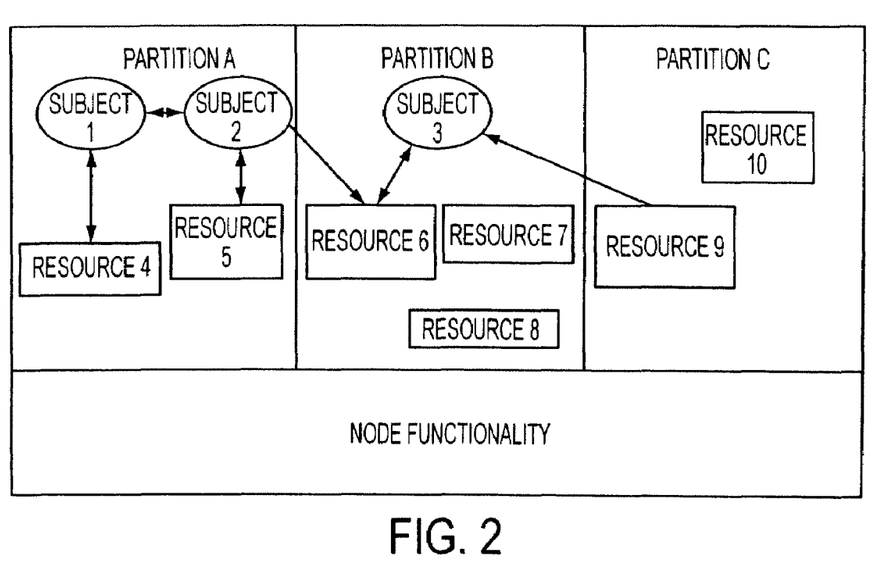
FIG. 2 is a logical block diagram of a node used in the system of FIG. 1.

FIG. 2 illustrates an exemplary embodiment of a node operating under the control of the SK, which serves to protect it from information flows that violate the SP, for example, due to unauthorized data transfer or unauthorized monitoring of data. In one embodiment, a node comprises any hardware resource running a single SK, where the SK controls information flow between and/or within the multiple partitions of the node according to the SK configuration data. In particular, each node runs its own SK which protects resources unique to that node. As stated above, the SK divides all resources under its control into partitions such that the actions of an active entity, such as a subject, in one partition are isolated from and cannot be detected by or communicated to an active entity in another partition, unless an explicit means for that communication has been established by the SK configuration data. Thus, unless the SK configuration data explicitly allows a subject from one partition to communicate with a partition of another partition, communication is not permitted.

FIG. 2 shows the node being partitioned into three Partitions A-C using subjects 1-3 and resources 4-10. As shown, Partition A includes subjects 1 and 2 and resources 4-5, Partition B includes subject 3 and resources 6-7 and Partition C includes resources 9 and 10 and no subjects. The arrows depict the SK flow policy for the node which is implemented by the SK configuration data. In addition, the system may include agents, which operate outside the scope of control of the PCS.

The Partitioning Communication System

The primary abstraction provided by the PCS is the channel. A channel is a connection from a single source subject to one or more destination subjects existing on the same or different nodes, including any physical or logical components that create the connection. In one exemplary embodiment, the PCS mediates subjects' interactions via channels according to two security policies: the channel connectivity policy and the resource management policy.

The channel connectivity policy describes the allowable connections between subjects. Essentially, this policy is an access control policy limiting which subjects may directly communicate via channels provided by the PCS. The resource management policy describes how the shared communications resources used to implement channels are to be allocated between channels and the extent to which channels may influence each other (either cooperatively or inadvertently) through the use of shared resources. When the resource policy does not allow different channels to influence each other, no use of a channel by a subject is observable by a subject or agent examining the result of actions performed on any other channel which is specified to be separated from the first channel.

Examples of components which could be built using the PCS and SK include secure middleware (CORBA, DDS, web services, SQL or client/server databases), email, instant messaging, distributed trusted downgraders, and guards. By enabling "end-to-end" versions of the security policies enforced by the SK, the PCS facilitates the construction of secure distributed systems. A system in which the PCS is used could include middleware that supports features such as Remote Procedure Call (RPC) facilities or interface definition languages (IDL).

PCS Configuration

Figure 3:
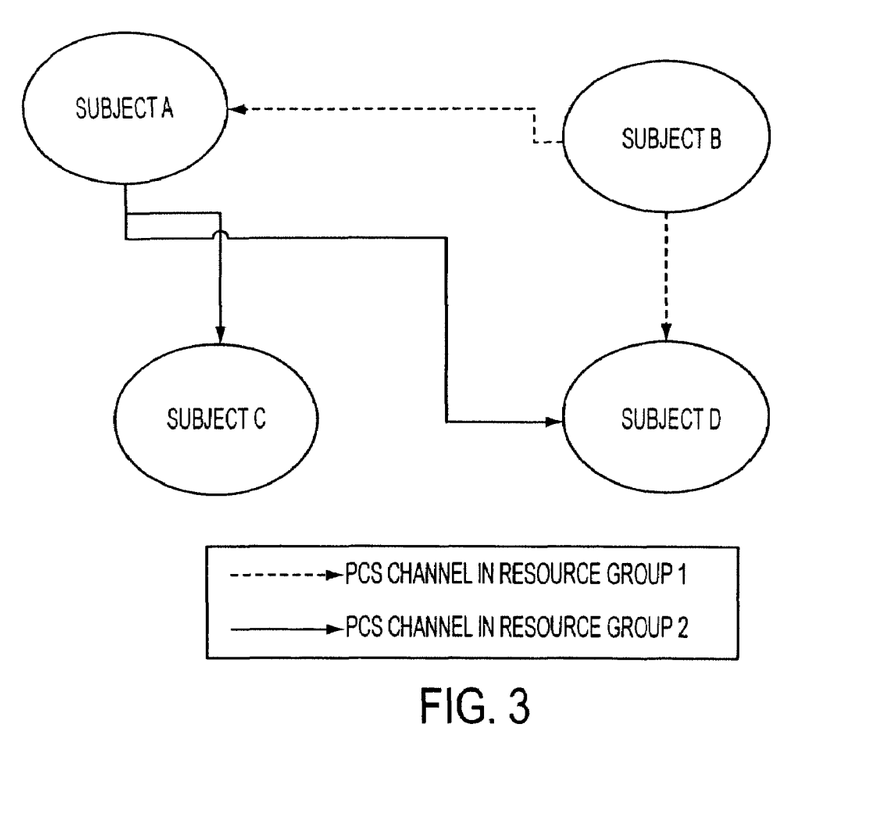
FIG. 3 is a logical block diagram illustrating an exemplary PCS configuration.

FIG. 3 illustrates an example embodiment of a PCS security policy (SP) that includes a channel connectivity policy and a resource management policy as set forth in a PCS configuration data. Every arrow in the graph represent a logical one-way channel from a single source subject to one or more destination subjects. As shown, the security policy SP allows subject to communicate over a one-way PCS channel in resource group 1 with subject A and subject B.

Likewise, the security policy allows subject A to communicate over a one-way PCS channel in resource group 2 with subject C and subject D. However, subjects may not communicate with other subjects outside of their resource group without violating the SP. It is noted that the figure illustrates a simple embodiment of the SP, and that other different resource policies having different restrictions, numbers of subjects, and numbers of resources may be used, as would be understood by those skilled in the art. The use of resource groups enforces complete separation of communications resources from channels belonging to different groups. The PCS configuration data may also place restrictions on the interactions within the resource groups. The degree of resource-based interaction within the groups is specified by PCS configuration data, where a more detailed policy could place further restrictions on the interactions within a group. The PCS configuration data also defines the subject-level or partition-level control granularity.

The representation format for the PCS configuration data, including channel connectivity and resource management policies, can comprise any suitable form of specification, either explicit or derived. Preferably, the PCS configuration data specification is unambiguous and allows a human examiner (possibly with tool support) to determine whether any given potential connection would be allowed by the policy, and every resource allocation rule specified by the policy.

PCS Operation

Because the PCS is dependent upon the SK, it can not begin it's own initialization until the SK loads itself, loads the partitions, including all client partitions (CPs), PCS partitions, device driver partitions, etc. Then, the SK begins running the PCS partitions. The SK correctly loads the PCS's code and data into the correct partition(s), and inform the PCS if unrecoverable errors prevent correct loading.

Figure 4:
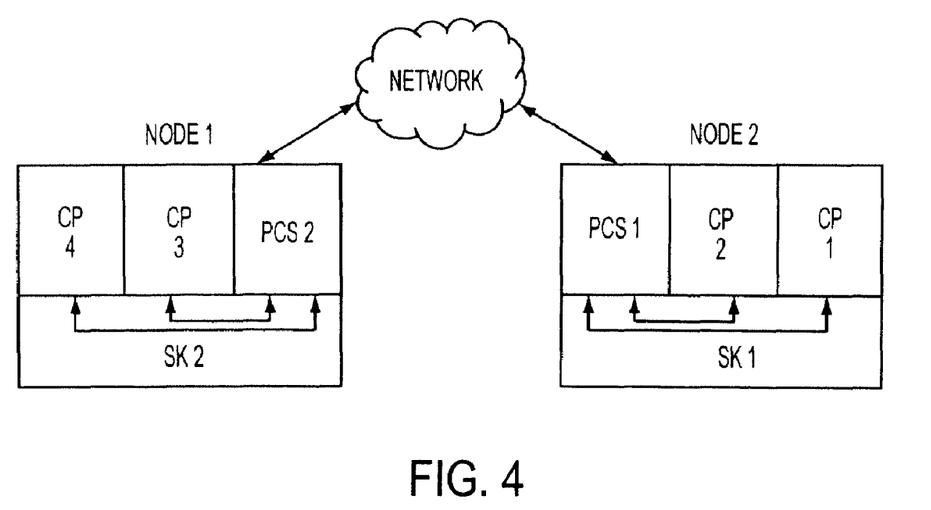
FIG. 4 is a logical block diagram of a system that uses the PCS to communicate data between two nodes.

FIG. 4 shows an exemplary implementation of the system that provides inter-node communication between two nodes 1 and 2 according to the present invention. Each node runs a corresponding SK1 and SK2, which provides for memory allocation, loading of the code, assigning communication resources, I/O handling etc. As shown, each of the SK1 and SK2 loads corresponding PCS1 and PCS2 into the nodes 1 and 2 and partition the node. SK1 partitions node 1 to CP1 and CP2, which are configured for access by PCS 1, and SK2 partitions node 2 to CP3 and CP4, which are configured for access by PCS2.

Once the SK is initialized, a PCS control partition loads PCS configuration data, including the channel connectivity policy, the resource management policy, and the network description. The PCS ensure that violations of the channel connectivity policy or resource management policy do not occur due to detectable failures.

Figure 5:
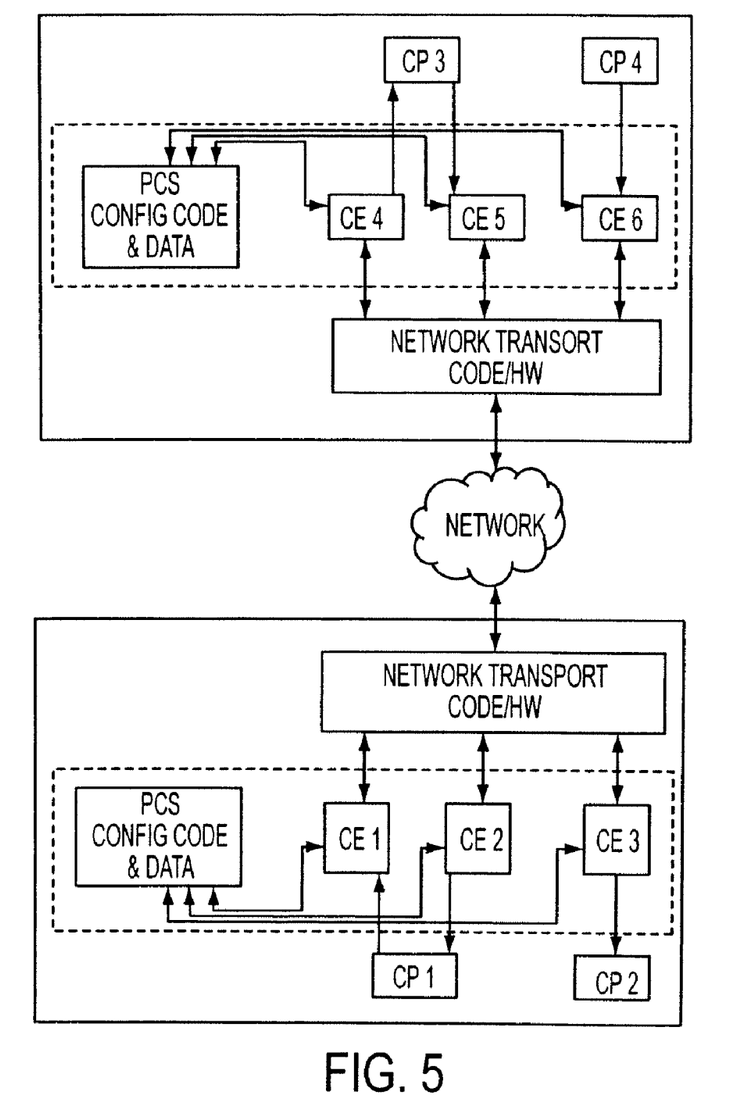
FIG. 5 is a more detailed logical block diagram of the system of FIG. 4.

FIG. 5 shows a more detailed embodiment of the system of FIG. 4. As shown by the dotted line, the PCS maintains a domain for its own execution that protects itself and its resources from external tampering or unauthorized disclosure by untrusted subjects and agents. The PCS domain comprises a number of partitions implementing the connectivity via channel endpoint (CE) partitions or subjects. A PCS configuration code and data partition is responsible for managing configuration data and bindings. The PCS configuration data defines bindings to CEs at either the subject or partition level, as supported by the underlying SK.

Before communicating data between subjects on separate nodes, the PCS ensures that the nodes participating in the communication have consistent configuration data. It should be noted that the entire PCS configuration data need not be stored on each node. All is needed on each node is a subset of the PCS configuration data that is sufficient for the node to determine that its configuration is consistent with the configurations of other nodes it is authorized to communicate with. Multiple partial PCS configurations are consistent if their use by the nodes does not result in violations of the complete policies of which the partial policies are subsets of. By verifying that all nodes have compatible configuration data before performing inter-node communications, inadvertent or malicious modification to the PCS configuration data is prevented.

For all shared resources, such as network access hardware/software, cryptographic hardware/software, etc., the PCS initializes and test those resources. For every channel, a sending CE performs mutual authentication with every receiving CE, and establishes a shared secret key with those endpoints. In one embodiment, the allocation of computational resources such as a time slice for a channel and RAM space are completed during SK initialization and do not require explicit handling by the PCS at boot time. Once initialization of the shared resources and channels is completed, the subjects in the CPs are notified that the channels are ready for data communication. In one exemplary embodiment, the subjects begin communicating data over the channels via the SK's RPC.

In an exemplary embodiment, the configuration of the underlying SK prevents subjects in one node from communicating data with subjects i separate nodes without invoking the PCS. The SK also enables the PCS to control when a resource under its control is made available to subjects, thereby gaining access to that resource until the PCS grants authorization. The SK protects partitions from each other, disallowing any modification of data residing in PCS partitions by subjects other than those belonging to the PCS. Preferably, the system in which the PCS is used includes features that deal with threats to availability to the underlying communications mechanism at the physical layer of the network, which have access to a communications resource via a mechanism that bypasses the PCS.

Security Threats

An agent represents an active entity that poses a security threat to data communication. An agent may be a malicious or faulty software or hardware entity that intentionally or unintentionally attempts to violate the SP. An agent may be a faulty component of a node, or may be a malicious device internal or external to the node that illicitly creates and monitors information communicated by the node.

The PCS both provides and relies upon interfaces provided by the SK to prevent security breaches. With the exception of interfaces which provide services guaranteed to be trustworthy by the SK, the PCS must protect itself against threats from the use or availability of those interfaces. Otherwise, a malicious agent could use the SK interfaces in violation of the SP. These interfaces are unique in that the SK is not able to provide the guarantees, which satisfy the authentication, integrity, or confidentiality requirements of the PCS. Consequently, the PCS treats all data received via the inter-node communications interface as coming from a potentially hostile source.

The following are some of the examples of security threats addressed by the PCS. A malicious agent may attempt to corrupt subject or data while it is being transmitted between nodes. An agent may attempt to illicitly gain information by observing the presence or absence of messages transmitted over inter-node communication channels. A malicious or faulty subject may attempt to violate the SP by communicating with another subject using an unintended communications path. A malicious or faulty subject may attempt to block or delay the communications of other subjects by exhausting or monopolizing shared communications resources. An agent may attempt to view subject data in violation of the SP by reading network data directly. A malicious or faulty subject may attempt to illicitly access subject data by examining resources, which have not been prepared for its use. A malicious or faulty subject may attempt to modify data communicated to another subject by modifying that data while it is within a PCS partition. A malicious or faulty subject or agent may attempt to cause the PCS to corrupt itself or subject data under its control by passing syntactically or semantically invalid requests to the PCS. A malicious or faulty subject or agent may attempt to masquerade as another subject by presenting invalid data to PCS interfaces, threatening subject data. A malicious or faulty subject may attempt to modify the PCS configuration data or other internal data structures, causing the PCS to fail to enforce the SP, threatening both the system security and subject data. A malicious or faulty subject may attempt to gain unauthorized information from an improperly sanitized or incompletely initialized-shared resource. A malicious or faulty subject may attempt to send information to a subject or agent it is not authorized to communicate with.

Covert Channels

The PCS prevents the presence or absence of communication between two subjects on separate nodes from being observable to those agents with the ability to examine inter-node communications. The PCS ensures that subjects or agents not party to a communication are unable to observe the use of communications channels. Also, the PCS prevents the use of one channel from influencing the observable behavior of another channel when those channels are required to be separated by the SP. The PCS allows only those information flows to proceed that are explicitly authorized by an information flow policy as set forth in the PCS configuration data. In one embodiment, the PCS provides protection against traffic analysis by agents that results in illicit information flows. The PCS counters the traffic analysis threat by obscuring or masking exhibited characteristics of communication resources in a way that eliminates or limits illicit information flows of this type. The PCS obscures the exhibited characteristics from all entities other than the intended recipient. The PCS, however, does not obscure these characteristics from the intended recipient. The PCS obscures the characteristics from the agents by separating a subject in one node and one or more subjects in another node when communicating data over the one or more channels. The PCS configuration data sets for the parameters for separation of the subjects on different nodes.

More specifically, the PCS controls inter-node communication so that the communication of one or more messages between the nodes meets a defined communication criteria that is independent of the communications characteristics exhibited between CEs or between one or more communication resources. The exhibited communications characteristic may relate to the timing of one or more messages, duration of one or more messages, frequency of communication of one or more messages, size of one or more messages, source of one or more messages, destination of one or more messages and content of one or more messages. The defined communication criteria may also relate to meeting an allocated communication throughput, allocated bandwidth, allocated data rate, or a system operating mode. For an embodiment incorporating all allocated bandwidth in the communication-criteria, either a fractional share of available bandwidth or a proportional share of available bandwidth may be use may use be a fractional share of available bandwidth or a proportional share of available bandwidth.

In one embodiment, the PCS obscures exhibited communication characteristics over a channel from agents by padding the data communicated between subjects on different nodes. Under this arrangement, the CE reads data from the CP using the SK's IPC mechanism until either the CP has no more data to send or an upper bound has been reached. For this example, assume that the bound is a constant defined by the PCS configuration data. An example bound might be 30 kilobytes per one millisecond time slice. If the CP does not provide enough data to meet the upper bound, the sending CE pads the data so that the length of that data is equal to the upper bound. For example, if the bound is 30 KB/ms and the CP provides 10 KB, the sending CE pads the data with 20 KB. Alternatively, the sending CE may also include additional messages. The sending CP waits for the beginning of its next time slice, repeating the listed steps. In addition to filling a time slice, the CE may also alter the quantity, frequency, and size of messages communicated in accordance with the defined communication criteria to obscure or eliminate covert channels and illicit information flows.

The operations performed by the receiving channel endpoint are essentially the inverse of those performed by the sending channel endpoint. The receiving channel endpoint takes data from the transport, decrypts it, removes padding, and finally passes it on to the client partition. There is no rate limiting performed by the receiving channel endpoint.

Transmission Confidentiality

The sending CE also encrypts the padded data using a previously established shared secret. This encryption may be performed by the CE in software, or may be offloaded to a hardware encryption device.

Preferably, information flow control policy requires confidentiality of transmissions between nodes by cryptography or encryption to eliminates illicit information flows due to eavesdropping of message content by an agent. To provide guarantees of confidentiality and authentication, the PCS establishes trustworthy shared secrets and performs mutual authentication. This mechanism is often referred to as the system's "trust anchor". Cryptographically strong integrity verification (as opposed to weaker methods such as CRC or parity) is necessary to support the verification of integrity for data communicated by subjects between nodes in the presence of malicious agents. Example mechanisms which provide trust anchors include statically shared secrets, distributed webs of trust (the PGP model), and centralized Public Key Infrastructures (PKI) (the model for most secure email and web identity schemes in use today).

Data Integrity

The PCS verifies the integrity of all user data and all security related data whose integrity is necessary for the enforcement of the SP, when the data is communicated by the subjects between nodes. The PCS separates data when transmitted between physically-separated parts of the system, based on channel connectivity and resource management policy attributes stored in the PCS configuration data. The PCS monitors user data transmitted between physically separated parts of the system for any changes to transmitted data. In order to achieve transmission integrity, the PCS prevents the modification of user data after it is transmitted. The PCS validates each communication request and monitors transmitted user data for modifications. The PCS detects modification of data, substitution of data, deletion of data, for data transmitted between separate parts of the system.

Resource Sharing

The sharing of communications resources, such as memory buffers, between subjects introduces the potential for illicit information flow when these resources are de-allocated from one subject and allocated to another. The PCS ensures that any previous resource information is made unavailable upon the allocation or deallocation of resources from all subjects. In one embodiment, the PCS clears contents of shared resource, memory, registers, etc., of relevant residual information left over from previous use.

Replay Messages

The PCS prevents successful inter-node communication of replayed messages. For example, if the PCS is unable to distinguish an original message from a duplicate of that original message from a faulty or malicious agent, then that agent may use replayed messages to create unauthorized information flow. The PCS prevents delivery or use of the data when replay is detected by discarding and potentially logging the message.

Identification

If a faulty subject or agent is permitted to impersonate another entity, then unauthorized information flow may occur. In one embodiment, the PCS requires each subject to identify itself before allowing any other PCS mediated actions on behalf of that subject. Consequently, the information flow policy permits an information flow between a controlled subject and controlled information via a controlled operation if the identity of the subject has been verified and the information flow is compliant with channel connectivity and resource management policies. The PCS verifies the identity of a subject or node before applying any policy, which is conditional upon subject or node identity.

Quotas

The PCS prevents subjects from monopolizing a resource thereby denying use of that resource to other subjects. In order to prevent denial of service stemming from shared resource usage, the PCS mediates use of shared resources to prevent resources used to implement one channel from influencing resources used to implement another channel. The PCS enforces usage quotas as specified by the PCS Configuration data. More specifically, the PCS enforces maximum quotas of sharable communications resources that channels and subjects can use simultaneously. The PCS also ensures the provision of minimum quantity of each proportional share of communications resources that is available for channels and subjects to use simultaneously.

Semantic Validation

The PCS validates all requests to ensure that requests are semantically valid and do not cause corruption or violate the SP.

Audit

The PCS supports a damage assessment feature by generating audit information for storage by a logging component following a failure. The PCS selectively generates audit data that describes any security-relevant events it detects. These events include, but are not limited to: initialization of the PCS, successful or unsuccessful verification of the system's configuration data, connection to- or from other nodes and apparent attempts to defeat or circumvent system security functions.

Conclusion

From the foregoing, it would be appreciated that the PCS comprises any suitable combination of hardware and/or software that provides inter-node communications amongst subjects running in isolated partitions on separate nodes while enforcing configurable separation security policies on the communications. Consequently, the PCS enables policy-constrained communications amongst subjects running on separate nodes in a distributed system. In this way, the PCS allows reconfiguring the partitioning of nodes without fear of introducing new threats to data confidentiality or integrity due to inter-node communications between those partitions and protects inter-node communications in an essentially location-transparent manner with respect to communications security.

More specifically, the PCS only allows explicitly authorized information flows to occur, thereby preventing the use of a channel from influencing shared communications resources in a manner that affects resources visible to unauthorized subjects or agents. Among other things, the PCS also provides data confidentiality protection and protection against traffic analysis. The PCS manages shared communications resources to provide channel separation and usage quotas. The PCS authenticates the nodes and subjects and verifies data integrity.

The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

We claim:

1. A communication system, comprising:
   a plurality of nodes each running a separation kernel (SK) that defines at least one partition on a corresponding node, wherein the at least one partition on a node communicates data with one or more partitions on another node over one or more communication channels, a data communication with the at least one partition on the node over the one or more communication channels exhibiting at least one exhibited communication characteristics; and
   a communication controller that obscures the at least one exhibited communication characteristics to prevent an illicit flow of information from the at least one partition on the node to a partition on another node.

2. The communication system of claim 1, wherein the communication controller obscures the at least one exhibited communication characteristics according to a communication criteria that is independent of the at least one exhibited communication characteristics.

3. The communication system of claim 2, wherein the communication criteria relates to at least one of an allocated communication throughput, an allocated bandwidth, an allocated data rate, or a proportional share of available bandwidth.

4. The communication system of claim 1, wherein the SK assigns one or more subjects to a partition for communicating the data and one or more resources for creating the one or more channels.

5. The communication system of claim 4, wherein the one or more resources comprises one or more of a communications bus resource, a protocol stack resource, an encryption resource, an execution time slice, or an execution frequency.

6. The communication system of claim 1, wherein obscuring the at least one exhibited communication characteristics comprises at least one of padding communicated data or including additional messages to fill a time slice.

7. A method of communicating data, comprising:
   running a separation kernel (SK) on a node to define at least one partition,
   communicating data between the at least one partition on the node and one or more partitions on another node over one or more communication channels, a data communication with the at least one partition on the node over the one or more communication channels exhibiting at least one exhibited communication characteristics; and
   obscuring the at least one exhibited communication characteristics to prevent an illicit flow of information from the at least one partition on the node to a partition on another node.

8. The method of claim 7, wherein the communication controller obscures the at least one exhibited communication characteristics according to a communication criteria that is independent of the at least one exhibited communication characteristics.

9. The method of claim 8, wherein the communication criteria relates to at least one of an allocated communication throughput, an allocated bandwidth, an allocated data rate, or a proportional share of available bandwidth.

10. The method of claim 7, wherein the SK assigns one or more subjects to a partition for communicating the data and one or more resources for creating the one or more channels.

11. The method of claim 10, wherein the one or more resources comprises one or more of a communications bus resource, a protocol stack resource, an encryption resource, an execution time slice, or an execution frequency.

12. The method of claim 7, wherein obscuring the at least one exhibited communication characteristics comprises at least one of padding communicated data or including additional messages to fill a time slice.

* * * * *